UNITED STATES PATENT OFFICE.

THORSTEN NORDENFELT, OF WESTMINSTER, ENGLAND.

PROCESS OF OBTAINING ALBUMEN FROM BLOOD.

SPECIFICATION forming part of Letters Patent No. 357,331, dated February 8, 1887.

Application filed March 23, 1886. Serial No. 196,274. (No specimens.) Patented in England June 18, 1885, No. 7,462; in France March 15, 1886, No. 174,770; in Belgium March 15, 1886, No. 72,354, and in Germany March 25, 1886, No. 37,955.

*To all whom it may concern:*

Be it known that I, THORSTEN NORDENFELT, a subject of the King of Sweden, residing at 53 Parliament street, in the city of Westminster, England, engineer, have invented certain new and useful Improvements in the Manufacture of Blood Albumen, (for which Letters Patent have been granted to me in England, No. 7,462, dated June 18, 1885; in France, No. 174,770, dated March 15, 1886; in Belgium, No. 72,354, dated March 15, 1886, and in Germany, No. 37,955, March 25, 1886,) of which the following is a specification.

The method at present in use for manufacturing albumen from blood has many disadvantages. It consists in pouring the fresh blood into small vessels, in which it is left standing for twenty to thirty hours, during which time the blood coagulates and forms itself into a homogeneous mass, from which serum gradually separates. In the separation many of the red particles accompany the serum and gradually settle at the bottom of the vessel. The clear serum is then poured off with the utmost care and best blood albumen is obtained therefrom; but the product forms only twenty to thirty per cent. of the whole, the very slightest trepidation being enough to stir up the particles from the bottom and give a more or less red tinge to the otherwise almost colorless serum.

Albumen, being subject to very rapid decomposition, does not admit of the settling of the serum being repeated several times. The liquor which is not perfectly clear can only be used for a second quality and the bottom sediment for an article of third quality. The liquors obtained are generally dried in small metal troughs, which are placed in well-ventilated drying-rooms; but as this drying process requires a long time, the albumen, when dried, is often found to be in a more or less putrid state, which greatly diminishes its value.

In this my invention the blood intended for the manufacture of albumen is freed from the fibrine by stirring or whisking by mechanical or other means, and is afterward subjected to careful straining or filtering in order to remove from it all mechanical impurities.

When a fine and almost colorless albumen is wanted, one hundred to one thousand grams of sugar dissolved in blood and a similar quantity of purest volatile oil—such, for instance, as paraffine-oil—is carefully mixed with one hundred kilograms of blood. The sugar, which does not in the slightest way affect the chemical purity of the product, greatly facilitates the separation of the serum, and preserves the same from decomposition and putrefaction during the succeeding drying process. The volatile oil makes the serum clear and almost colorless, and as only a thoroughly pure oil is used it evaporates during the drying process and leaves behind no injurious ingredients, which is a very important thing, as otherwise in using the albumen for printing purposes, when it has to be mixed with various chemicals, precipitates injurious to the coloring might easily appear, as is often the case with some of the so-called "bleached" albumens. The blood prepared in this way is then allowed to run into a centrifugal machine while revolving at a high speed. It is important that the blood should not be precipitated from any height into the centrifugal machine, but should be slowly poured in at the bottom and centrally, as otherwise the blood-cells might be crushed, which must be avoided if a perfectly pure serum is to be obtained. The comparatively heavy blood particles separate and remain on the periphery, while the serum, on account of its less specific gravity, passes toward the center. The blood particles and the serum are forced out through separate passages or apertures and collected separately. The machine employed is such as is used for the separation of cream from milk. Should the serum not be perfectly clear or have a reddish tint, a further quantity of volatile oil is added, and the whole is well stirred for five to fifteen minutes. The solution is then concentrated in vacuum or by other means; but the former is to be preferred. The final drying of the mass can be effected in flat vessels; but great care must always be taken that the temperature never exceeds 45° to 50° centigrade, and the best possible ventilation of the drying-room is also of great importance for obtaining a good article.

By the process herein described as much as eighty per cent. of serum can be obtained, all of which will yield albumen of first quality only.

Having now particularly described and ascertained the nature of my said invention and in what manner the same is to be performed, I would have it understood that what I claim is—

1. My improvements in the manufacture of blood albumen, consisting in separating, by stirring or whisking, the fibrine from blood, then adding to the serum sugar and paraffine-oil, afterward separating the heavier particles by centrifugal action, and finally evaporating and drying the albumen, substantially as described.

2. My improvement in the manufacture of blood albumen, consisting in separating, by stirring or whisking, the fibrine from blood, passing the material through a centrifugal machine, and finally evaporating and drying the albumen, substantially as described.

THORSTEN NORDENFELT.

Witnesses:
E. BRUSEWITZ,
8 *Princes Street, Hanover Square, W.*
H. WERN,
132 *Haverstock Hill, N. W.*